United States Patent [19]

Murphy et al.

[11] Patent Number: 5,103,405
[45] Date of Patent: Apr. 7, 1992

[54] DIGITAL PROBABILISTIC REASONING ELEMENT

[75] Inventors: John H. Murphy; Terry A. Jeeves, both of Penn Hills; David K. McLain, Mount Lebanon, all of Pa.

[73] Assignee: Westinghouse Electric Corp., Pittsburgh, Pa.

[21] Appl. No.: 416,622

[22] Filed: Oct. 3, 1989

Related U.S. Application Data

[63] Continuation-in-part of Ser. No. 364,475, Jun. 12, 1989.

[51] Int. Cl.$^5$ .............................................. G06F 15/18
[52] U.S. Cl. ...................................... 395/10; 364/807; 395/601
[58] Field of Search ................. 364/513, 807; 307/445

[56] References Cited

PUBLICATIONS

Modern Dictionary of Electronics; Rudolf F. Graf; Howard W. Sams & Co., Inc.; 1977; p. 473.

Primary Examiner—Allen R. MacDonald
Attorney, Agent, or Firm—M. P. Lynch

[57] ABSTRACT

A digital set theoretic system is disclosed that expands the reasoning capability from reasoning with probability measures to reasoning with set theory measures and other Venn diagram type operations using linear transformations and power series transformations, and appropriate hardware and software implementations. This expansion also leads to an increase in precision of the output which can be provided by a hardwired power series expansion. A recursive power series expansion increases this precision while reducing the spatial requirements. The system also enhances flexibility by allowing the constants of the power series expansion to be selectable.

12 Claims, 4 Drawing Sheets

FIG. 5
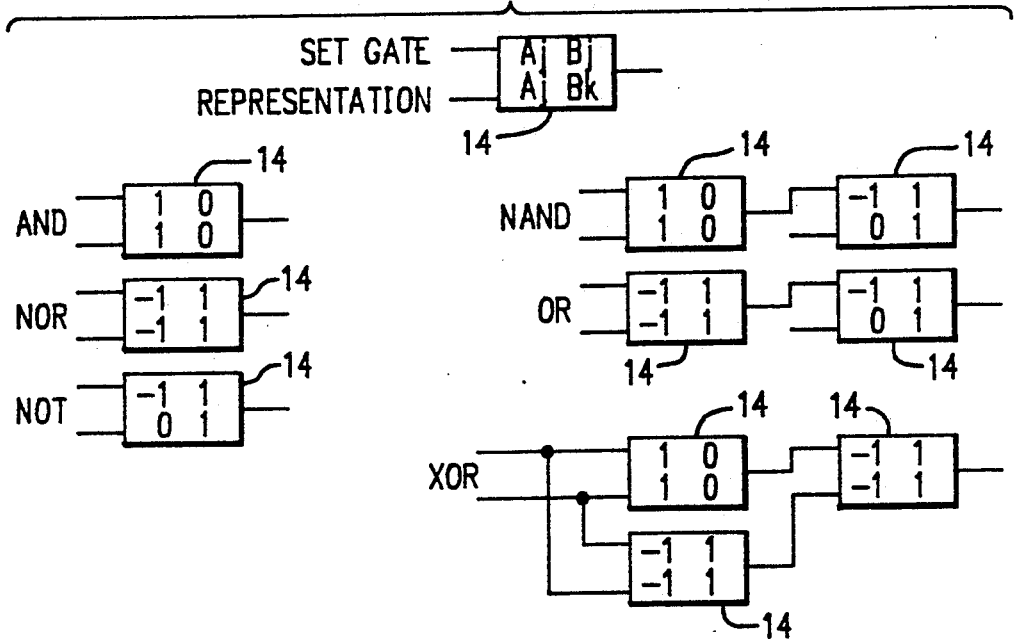
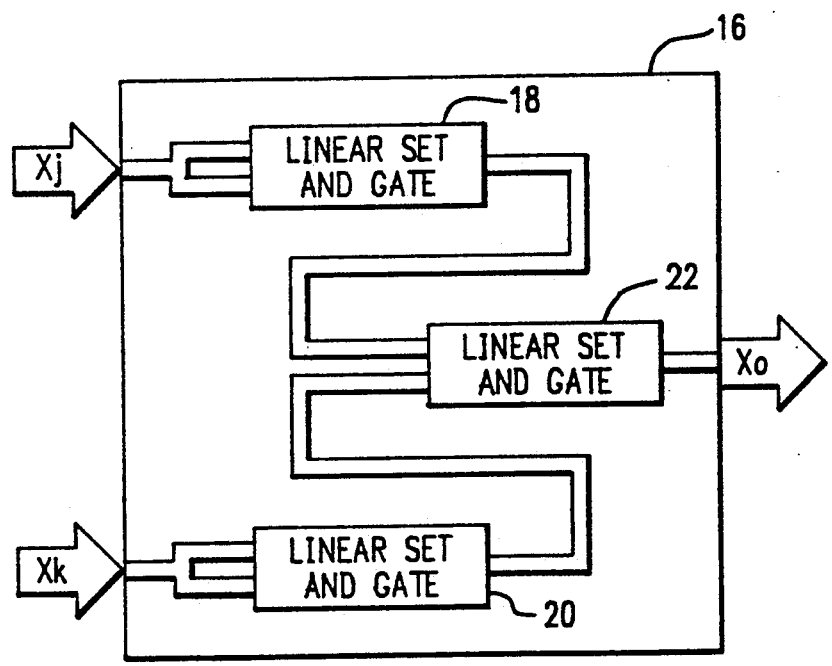
FIG. 6

DIGITAL PROBABILISTIC REASONING ELEMENT

CROSS REFERENCES TO RELATED APPLICATION

This is a Continuation-In-Part of U.S. Ser. No. 07/364,475 filed on June 12, 1989 and entitled Probabilistic Reasoning System. This application is related to U.S. application entitled Neural Networks And Adaptive Reasoning Systems by Murphy and Jeeves having Westinghouse docket number 55,546 and to U.S. Application entitled Neural Network Optimization Method by Murphy and Jeeves having Westinghouse docket number 55,704. All of these applications are incorporated by reference herein.

BACKGROUND OF THE INVENTION

1. Field of the Invention

The present invention is directed to a probabilistic reasoning expert system and, more particularly, to a software and hardware implementation of an improved expert system which bases conclusions on the mathematics of deductive and inductive reasoning using set theory measures, provides increased precision in a high ordered combinatorial capability and enhanced flexibility with selectable constants.

2. Description of the Related Art

Expert systems need a calculus for decision making based on sound mathematical principles. Without a solid foundation for such reasoning, there is little hope for using this technology to perform critical decision-making. These systems not only need to operate in the realm of measures of belief and probability but in any set theory measure useful in decision making. Precision in providing expert diagnoses in systems with a military or human safety application is also critical to acceptance of such systems. Providing enhanced programmability will also make the systems easier to tailor to a particular application.

SUMMARY OF THE INVENTION

It is an object of the present invention to provide a system capable of using any set theory measure in the reasoning process to make diagnoses.

It is another object of the present invention to use polynomial equations to represent set theoretic operations.

It is also an object to produce a system with improved precision without a commensurate increase in the necessary hardware and with comparable speed.

It is an additional object of the present invention to provide a system with selectable combinatorial constants allowing increased flexibility.

The above objects can be attained by a system that expands reasoning capability beyond reasoning with probability measures to reasoning with other set theory measures such as in traditional Venn diagrams. This expansion also warrants an increase in precision of the measures provided by performing a power series expansion on an input. Flexibility is enhanced by the present invention by allowing constants to be selectable These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 depicts some of the set functions executable by the gate of FIG. 3;

FIG. 6 illustrates a high resolution quadratic gate;

DESCRIPTION OF THE PREFERRED EMBODIMENTS

Figure 1:
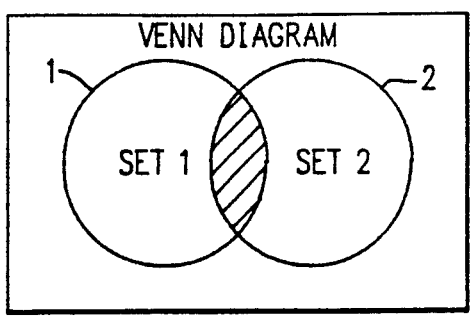
FIG. 1 is a Venn diagram representing the intersection set theory function.
Figure 2:
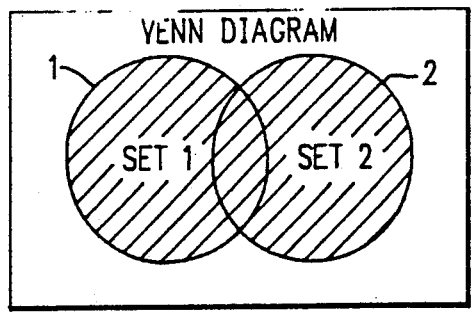
FIG. 2 is a Venn diagram illustrating the union set theory function.
Figure 3:
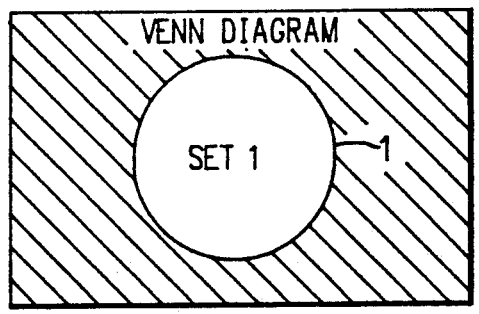
FIG. 3 represents the Venn diagram of the complement function.

The parent application is directed to an expert system that uses probability measures in making the inferences on a diagnosis. Probability is one of the measures, available in set theory, which can be used to make reasoned judgments. Using probabilistic reasoning maps sets with values between zero and one onto another set with values between zero and one. Other set theory measures, based on traditional Venn diagram theories, can also be used to make reasoned judgments. The present invention is designed to use polynomial equations to represent the set theoretic operations. The three basic set operations are intersection (SET 1 OR SET 2), see FIG. 1, union (SET 1 AND SET 2), see FIG. 2, and complement SET 1, see FIG. 3. All other set theoretic operations are combinations of these three basic operations. In this invention a first set X is transformed into another set SET 1 via various combinations of linear transformations or power series expansions. For example, the union of sets $X_1$ and $X_2$, where $X_1$ and $X_2$ are independent, using the method of the present invention is set forth in equation 1:

$$X_1 \text{ AND } X_2 = (A_1X_1 + B_1)(A_2X_2 + B_2) \quad (1)$$

which is a multiplication of two linear transformations and where $A_1$ and $A_2$ are one and $B_1$ and $B_2$ are 0.

The NOR set theoretic operation is realized, when $X_1$ and $X_2$ are independent, as set forth in equation 2:

$$X_1 \text{ NOR } X_2 = (-A_1X_1 + B_1)(-A_2X_2 + B_2) \quad (2)$$

which is a multiplication of two linear transformations where $A_1$ and $A_2$ and $B_1$ and $B_2$ are each one.

As discussed in the parent application, particularly with respect to equation 7 therein, a linear transformation represents a set theoretic operation on a set within the universe of discourse. For example, a set operation on set X is illustrated in equation (3):

$$\text{SET } 1 + A_1X + B_1 \quad (3)$$

which is the basic single linear transformation discussed in the parent application. As discussed above many set operations can be represented by higher order transformations such as equation 4 below:

$$\text{SET } 1 = A_1X_1^2 + B_1X_1 + C_1 \quad (4)$$

Figure 4:
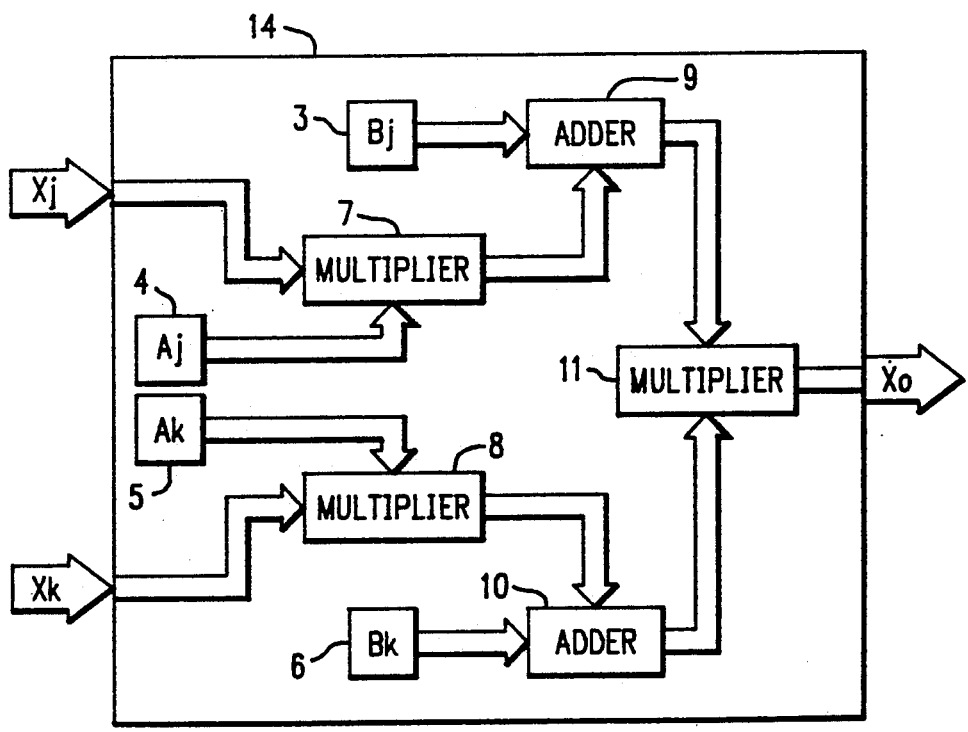
FIG. 4 illustrates the set gate.

The set gate illustrated in FIG. 4, and described in more detail in the parent application, can be used to obtain the intersection of or conjunction of SET 1 and SET 2. Using this approach, the present invention allows the construction of the set theory operations illustrated in FIG. 5 by appropriately setting the signs and magnitudes of the constants, as indicated in FIG. 5, in the gate of FIG. 4. That is, any set theory measure which can be represented using a set operation can be reasoned with using the discrete bus wide component, software or dedicated processor versions of the probabilistic gate discussed in the parent application.

It is often appropriate to increase the precision of the operation thereby representing the resulting set more accurately. This can be accomplished by providing a high order function gate such as a high-order AND function, of course realizing that the other high ordered functions such as NOR, can be accomplished with the appropriate constants. A high order AND function can be obtained in terms of the high ordered set operation previously discussed with respect to equations 1 and 4. A high order set operation can also be represented by a polynomial, namely a finite power series expansion:

$$X_o = A_o + A_1 X^1 + \ldots A_n X^n \tag{5}$$

The order of this polynomial is determined by a compromise between the amount of idle time available in the gate 14 and the accuracy needed to represent the implies function or set and the amount of space available for storing the coefficients. The high order function can also be written as a product of linear transformations:

$$X_0 = \prod_{i=1}^{n} [b_i + c_i X] \tag{6}$$

Figure 7:
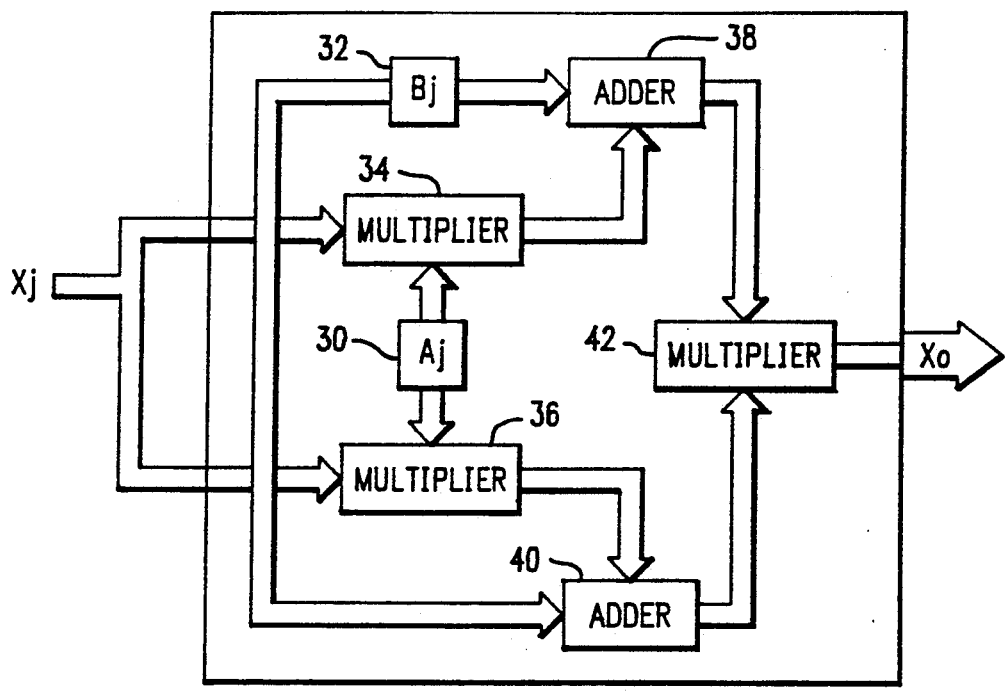
FIG. 7 illustrates the details of gates 18 and 20.

Since the probabilistic or set gate 14 of FIG. 4 is fundamentally a mechanism for multiplying two linear expressions together, if a linear AND gate 18 is supplied with the same signal on both inputs, as illustrated in FIG. 6, a quadratic AND gate is constructed. A power series expansion gate 16 is constructed of three quadratic gates 18–20 connected serially. As illustrated in FIG. 7, gates 18 and 20 include storage units 30 and 32, such as registers, for storing a pair of constants, and multipliers 34 and 36 for combining the input signal with a first constant. Adders 38 and 40 combine the second constant with the multiplied result and multiplier 42 combines the result of addition to obtain the high ordered output. The gate 22 of FIG. 6 is the same as illustrated in FIG. 4.

The power series expansion can alternately be written in terms of a recursive formula:

$$Y_{M+1} = A_{n-M} + Y_M X, \quad Y_o = 0, \quad 0 \leq M \leq B \tag{7}$$

$$X_o = Y_{N+1} = A_o + [A_1 + [A_2[A_3 + [A_4 + [A_5 + [\ldots ]X]X ]X]X]X]X \tag{8}$$

Figure 8:
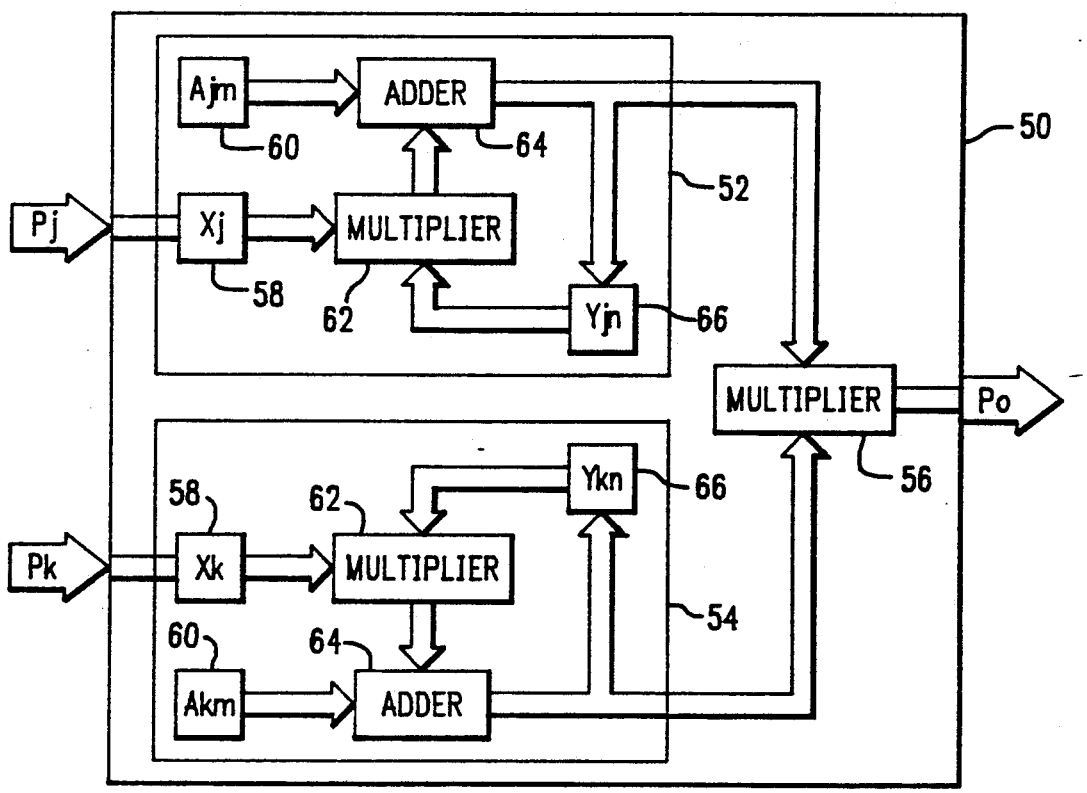
FIG. 8 illustrates a recursive high resolution gate.

This approach to obtaining the higher ordered AND function can be implemented using a gate as illustrated in FIG. 8. This gate includes two power series expansion units 52 and 54 and a multiplier 56. Each power series expansion unit includes temporary storage 58 for the input signal, a i register or memory 60 storing the constants, $A_i$, of equation 8, a multiplier 62, adder 64 and storage 66 for performing the recursive addition, multiplication and feedback.

The two approaches to the implementation of a high ordered probabilistic or set AND gate have complementary features The product of linear transformations requires a large number of storage registers to hold the linear transformation coefficients, in fact, twice as many as the recursive approach requires Since there is no unique solution for the Bi and Ci in terms of the Ai, the terms must satisfy certain constraints As previously discussed, the output is the multiplication of two linear transformations as illustrated in equation 9:

$$X_o = (ax+b)(cx+d) = acx^2 + (bc+ad)x + bd = Ax^2 + Bx + C \tag{9}$$

where $A = ac, B = (bc+ad)$ and $C = bd = 1$. Even though other constraints on A, B and C could be selected these constraints are preferred and will provide a satisfactory solution. The recursive technique is self contained in one processing element, is truly systolic and reduces the amount of idle time associated with processing elements awaiting the downloading of data because plural constants are stored in the element and the element provides temporary feedback storage.

Each of the methods illustrated in FIGS. 6 and 8 can be implemented as discrete bus wide units such as bus wide multipliers and adders as discussed in the parent application. The implementations can also be performed in a single processing unit performing the operations of FIGS. 6, 7 or 9 of the parent application for each input and multiplying the results. For example, the implementation of equation 10 below by a computer will perform the function of the gate of FIG. 6.

$$X_{out} = (\Sigma A_{ij} X_j)(\Sigma A_{ik} X_k) \tag{10}$$

The flowchart which is FIG. 6 of the parent application can be modified by one of ordinary skill to appropriately obtain the high resolution outputs discussed above. The system can also be implemented as a special purpose dedicated processor such as illustrated in FIGS. 8 and 23 of the parent application. A person of ordinary skill in the art can appropriately modify the dedicated processors of the parent application to implement the high resolution gates as described above.

Figure 9:
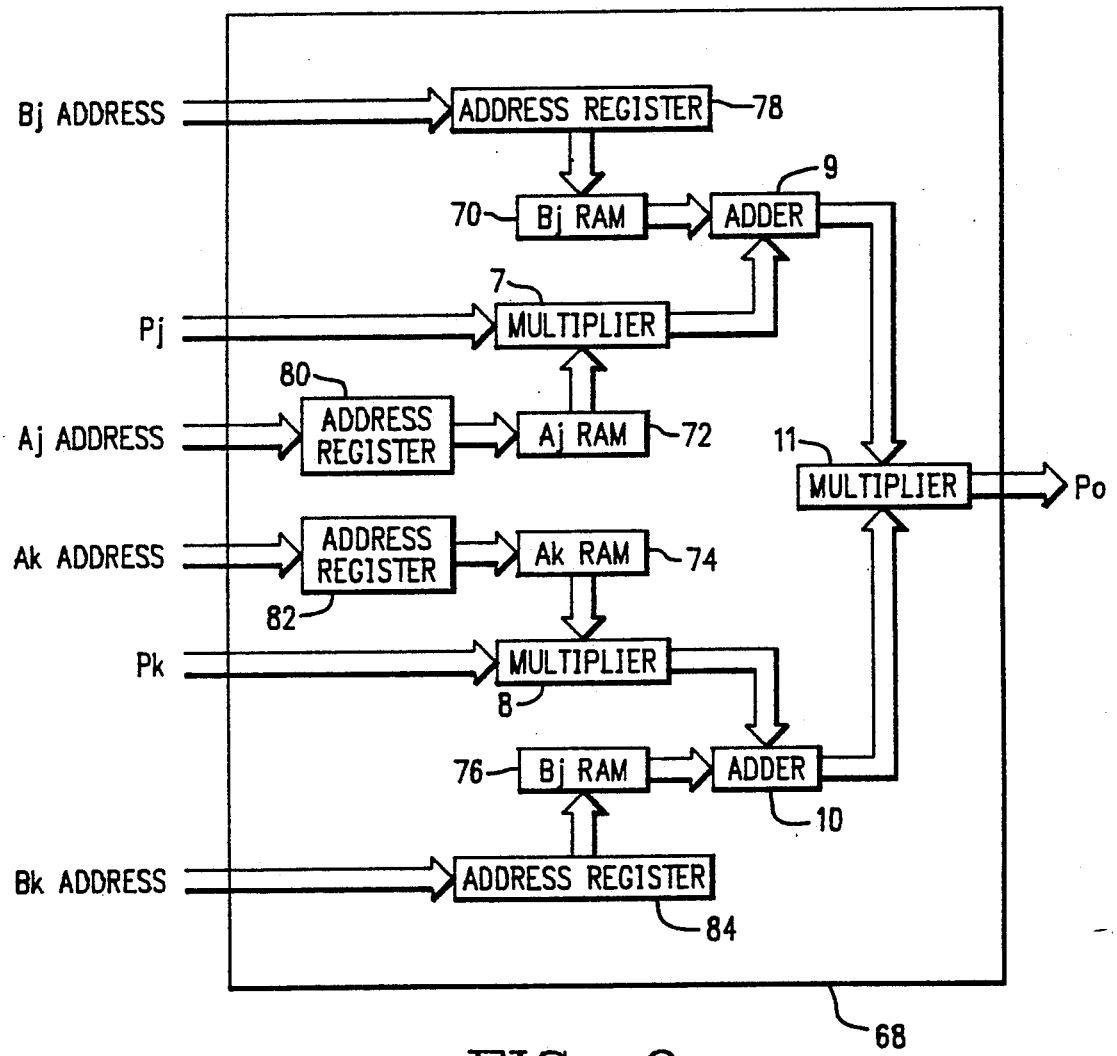
FIG. 9 illustrates a selectable constant gate 68.

To enhance the programmable capability of the system of the present invention or of the probabilistic reasoning system of the parent application, a selectable constants capability can be provided for a gate as illustrated in FIG. 9. This version of the gate substitutes random access memories 70–76 for the single constant storage illustrated in FIG. 4 and additionally provides address registers 78–84 for determining which constants stored in the RAMs are output. Although not shown in FIG. 9 each RAM is loadable from a bus outside the gate 68. During operation the address registers 78–84 are loaded with the address of the constants to be used in the current cycle and the output obtained. During the next cycle the address registers 78–84 are loaded with the address of the next set of constants to be used. It is of course possible to provide a storage RAM for the output of multiplier 11.

If a virtual binary tree of processors is implemented, as discussed in the parent application, the cycles of the gates, and therefore the constants selected, would be determined by the number of segments into which the diagnostic problem is divided. For example, if the expert system diagnostic problem had one thousand diagnoses to make and the virtual binary tree contained 100 processors, the problem would be segmented into ten 100 input cycles, where one set of ten sets of constants are loaded into the processors for each cycle. As can be seen, this approach improves the utilization efficiency of the virtual binary tree processors at some sacrifice in speed of diagnosis.

The higher ordered set function described herein not only can be used to improve probabilistic reasoning for traditional AI (expert) systems or neural network systems, but also provides a mechanism for spatial combination of information or signals for image recognition, 2D or 3D imaging, radar tracking, magnetic resonance imaging, sonar tracking and seismic mapping.

The many features and advantages of the invention are apparent from the detailed specification and, thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A processing element, comprising:
   first and second input lines receiving first and second inputs; and
   a digital set gate connected to said input lines, receiving the first and second inputs, for performing a non-zero, non-unity linear transformation and combination of the first and second inputs and producing an output set measure.

2. An element as recited in claim 1, wherein said digital set gate digitally executes $X_o = [A_j X_j + B_j] \cdot [A_k X_k + B_k]$ where $X_o$ is the output set measure, $X_j$ and $X_k$ are input sets and $A_j$, $B_j$, $A_k$ and $B_k$ are linear transformation constants.

3. An element as recited in claim 1, wherein said output set measure is a measure of AND, NOR, NAND, OR, XOR or NOT digital set operations.

4. An element as recited in claim 1, wherein said digital set gate digitally executes $X_o = [A_j X_j + B_j] \cdot [A_k X_k + B_k] + C_m$ where $X_o$ is the output set measure, $X_j$ and $X_k$ are input sets and $A_j$, $B_j$, $A_k$, $B_k$ and $C_m$ are linear transformation constants.

5. An element as recited in claim 1, wherein said gate comprises:
   first digital linear transformation means for performing a first digital non-zero, non-unity linear transformation on the first input using first and second constants;
   second digital linear transformation means for performing a second digital non-zero, non-unity linear transformation on the second input using third and fourth constants; and
   digital combination means for digitally combining the first and second linear transformations producing the output set measure.

6. A processing element, comprising:
   first and second input lines receiving first and second inputs; and
   a digital set gate connected to said input lines, receiving the first and second inputs, for performing a linear transformation and combination of the first and second inputs and producing an output set measure, said digital set gate combining power series expansions of the first and second inputs.

7. A processing element, comprising:
   first and second input lines receiving first and second inputs; and
   a digital set gate connected to said input lines, receiving the first and second inputs, for performing a linear transformation and combination of the first and second inputs and producing an output set measure, said digital set gate comprising:
   first digital linear transformation means for performing a first digital linear transformation on the first input using first and second constants, said first digital linear transformation means comprising:
   a first digital multiplier circuit digitally multiplying the first input times the first constant producing a first output; and
   a first digital adder circuit, connected to said first digital multiplier circuit, digitally adding the second constant to the first output producing a second output;
   second digital linear transformation means for performing a second digital linear transformation on the second input using third and fourth constants, said second digital linear transformation means comprising:
   a second digital multiplier circuit digitally multiplying the second input times the third constant producing a third output; and
   a second digital adder circuit, connected to said second multiplier, digitally adding the fourth constant to the third output producing a fourth output; and
   digital combination means for digitally combining the first and second linear transformations producing the output set measure, said combination means comprising a third digital multiplier circuit, connected to said first and second digital adder circuits, and digitally multiplying the second output times the fourth output producing the output.

8. A high resolution gate, comprising:
   first digital power series expansion means for digitally performing a power series expansion on a first input;
   second digital power series expansion means for digitally performing a power series expansion on a second input; and
   combining means for digitally combining the power series expansions produced by said first and second means to produce a set measure.

9. A high resolution gate as recited in claim 8, wherein said combining means is a first digital multiplier circuit and said first and second means each comprise:
   input signal storage;
   a second digital multiplier circuit connected to said input signal storage;
   constant storage storing plural constants;
   a digital adder circuit connected to said constant storage, said first digital multiplier circuit and said digital second multiplier circuit; and
   result feedback storage connected to said digital adder circuit and said second digital multiplier circuit.

10. A processing element, comprising:
    first through fourth digital address registers;

first through fourth constant memories connected respectively to said first through fourth digital address registers;

first and second digital multiplier circuits connected respectively to said first and second constant memories and to receive first and second inputs respectively;

first and second digital adder circuits connected respectively to said third and fourth constant memories and respectively to said first and second digital multiplier circuits; and a third digital multiplier circuit connected to said first and second digital adder circuits and producing a set measure output.

11. A high resolution gate, comprising:

a first digital linear set gate circuit receiving a first set input and producing a first non-zero, non-unity linear transformation output;

a second digital linear set gate circuit receiving a second set input and producing a second non-zero, non-unity linear transformation output; and a third digital linear set gate circuit connected to said first and second digital linear set gate circuits and producing a set measure from the first and second outputs.

12. A high resolution gate comprising:

a first linear set gate receiving a first set input and producing a first output;

a second linear set gate receiving a second set input and producing a second output; and a third linear set gate connected to said first and second linear set gates and producing a set measure from the first and second outputs;

wherein said first and second linear set gates each comprise:

first and second constant storages;

a first and second digital multiplier circuits connected to the first constant storage and receiving the respective input;

first and second digital adder circuits connected to said second constant storage and respectively to said first and second digital multiplier circuits; and a third digital multiplier circuit connected to said first and second adder circuit; and wherein said third linear set gate comprises:

third through sixth constant storages;

a fourth digital multiplier circuit connected to said first linear set gate and to said third constant storage;

a third digital adder circuit connected to said fourth constant storage and said fourth digital multiplier circuit;

a fifth digital multiplier circuit connected to said second linear set gate and to said fifth constant storage;

a fourth digital adder circuit connected to said sixth constant storage and said fifth digital multiplier circuit; and a sixth digital multiplier circuit connected to said third and fourth adder circuits.

* * * * *